United States Patent
Hu

(10) Patent No.: US 11,596,898 B1
(45) Date of Patent: Mar. 7, 2023

(54) SYSTEMS AND METHODS OF CARBON DIOXIDE SEQUESTRATION

(71) Applicant: Select Energy Services, LLC, Gainesville, TX (US)

(72) Inventor: Jinxuan Hu, Houston, TX (US)

(73) Assignee: Select Energy Services, LLC, Gainesville, TX (US)

( * ) Notice: Subject to any disclaimer, the term of this patent is extended or adjusted under 35 U.S.C. 154(b) by 0 days.

(21) Appl. No.: 17/528,117

(22) Filed: Nov. 16, 2021

(51) Int. Cl.
   *B01D 53/14* (2006.01)
   *B01D 53/62* (2006.01)
   *B01D 53/78* (2006.01)

(52) U.S. Cl.
   CPC ......... *B01D 53/1475* (2013.01); *B01D 53/62* (2013.01); *B01D 53/78* (2013.01); *B01D 2251/402* (2013.01); *B01D 2251/404* (2013.01); *B01D 2251/406* (2013.01); *B01D 2251/408* (2013.01); *B01D 2257/504* (2013.01)

(58) Field of Classification Search
   CPC .... B01D 53/1475; B01D 53/78; B01D 53/62; B01D 2257/504; B01D 2251/404; B01D 2251/406; B01D 2251/408; B01D 2251/402
   See application file for complete search history.

(56) References Cited

U.S. PATENT DOCUMENTS

| | | | | |
|---|---|---|---|---|
| 2,900,797 A | * | 8/1959 | Kurata | F25J 3/061 |
| | | | | 95/290 |
| 2004/0219090 A1 | | 11/2004 | Dziedzic et al. | |
| 2005/0120878 A1 | * | 6/2005 | Leppin | B01D 53/1475 |
| | | | | 95/236 |

FOREIGN PATENT DOCUMENTS

| | | | | |
|---|---|---|---|---|
| CA | 3 074 497 A1 | * | 3/2020 | ............ E21B 43/34 |
| CN | 112 138 420 A | * | 12/2020 | ........... B01D 53/002 |
| WO | WO 03/024605 A2 | * | 3/2003 | |

(Continued)

OTHER PUBLICATIONS

Czaplicka, Natalia, Utilization of Gaseous Carbon Dioxide and Industrial Ca-Rich Waste for Calcium Carbonate Precipitation: A Review, Department of Process Engineering and Chemical Technology, Faculty of Chemistry, Gdansk University of Technology, Narutowicza 11/12, 80-233 Gdansk, Polan, Nov. 26, 200, 25 pgs., retrieved at https://www.mdpi.com/1996-1073/13/23/6239, Dec. 9, 2022.

(Continued)

*Primary Examiner* — Timothy C Vanoy
(74) *Attorney, Agent, or Firm* — Foley & Lardner LLP

(57) ABSTRACT

An exemplary sequestering system and method are provided for carbon dioxide sequestration using at least one in-situ chemical species in water to produce at least one reaction product that sequesters carbon dioxide. In one embodiment, the automated system includes a reaction vessel and one or more diffusers. In one implementation, the reaction vessel is configured to receive a water supply, wherein the water includes at least one in-situ chemical species, and wherein the reaction vessel is further configured to receive a gas supply. The one or more diffusers are configured to receive at least a portion of the gas supply to diffuse carbon dioxide gas into at least a portion of the water, and wherein the reaction vessel is further configured to contain a mixture to allow the at least one in-situ chemical species to react with the carbon dioxide gas and forming at least one reaction product.

20 Claims, 9 Drawing Sheets

(56) References Cited

FOREIGN PATENT DOCUMENTS

| WO | WO 2006 034 339 A1 * | 3/2006 | ............. B01D 53/62 |
| WO | WO-2008/127557 A1 | 10/2008 | |
| WO | WO-2010/059804 A2 | 5/2010 | |

OTHER PUBLICATIONS

Daniel Dziedzic, et al., Feasibility Study of Using Brine for Carbon Dioxide Capture and Storage from Fixed Sources, Journal of the Air & Waste Management Association, 56:12, 1631-1641, DOI: 10.1080/10473289.2006.10464568, Dec. 2006, 12 pgs.

Veits, O., CO2 mineral trapping: Modeling of calcium carbonate precipitation in a semi-batch reactor, Energy Procedia, vol. 4, 2011, pp. 771-778, 8 pgs. , retrieved at https://www.sciencedirect.com/science/article/pii/S1876610211001202, Dec. 9, 2022.

* cited by examiner

SYSTEMS AND METHODS OF CARBON DIOXIDE SEQUESTRATION

BACKGROUND

In various industries such as oil and gas, mining, energy, transportation, and manufacturing, wastewater and carbon dioxide may be a product, by-product, or side product of various activities performed. Industries that produce wastewater and carbon dioxide may desire to process the wastewater and/or sequester the carbon dioxide.

SUMMARY

Some embodiments in this disclosure relate to a sequestering system for carbon dioxide using produced water that originates from hydrocarbon production. The sequestering system includes a reaction vessel configured to receive a produced water supply, the produced water supply includes produced water that originates from the hydrocarbon production, wherein the produced water includes at least one in-situ chemical species, wherein the reaction vessel is further configured to receive a gas supply, the gas supply including carbon dioxide gas. The sequestering system further includes one or more diffusers, wherein the one or more diffusers are configured to receive at least a portion of the gas supply to diffuse the carbon dioxide gas into at least a portion of the produced water, and wherein the reaction vessel is further configured to contain a mixture to allow the at least one in-situ chemical species of the produced water to react with the carbon dioxide gas to sequester the carbon dioxide gas by forming at least one reaction product, wherein the at least one reaction product settles at a lower level in the reaction vessel.

In some embodiments, the one or more diffusers are positioned upstream of the reaction vessel. In various embodiments, the one or more diffusers are positioned within the reaction vessel. In some embodiments, the produced water further includes a hydrocarbon, and wherein an upper level is formed in the reaction vessel that includes the hydrocarbon from the produced water, and wherein the at least one reaction product at the lower level is below the upper level. In various embodiments, an intermediate level of treated water is formed in the reaction vessel, and wherein the intermediate level is positioned below the upper level and above the lower level, and wherein the intermediate level, in certain implementations, is contiguous with the upper level. In some embodiments, a recirculation loop positioned between the intermediate level of the reaction vessel and the one or more diffusers, wherein the recirculation loop is configured to receive at least a portion of the treated water of the intermediate level of the reaction vessel. In various embodiments, the at least one reaction product at the lower level in the reaction vessel is a slurry including a combination of solid and liquid of the at least one reaction product.

Some embodiments relate to a method of carbon dioxide sequestration using at least one in-situ chemical species in produced water provided by hydrocarbon production to produce at least one reaction product that sequesters carbon dioxide. The method includes providing a gas including carbon dioxide. The method further includes providing produced water from the hydrocarbon production, wherein the produced water includes the at least one in-situ chemical species. The method further includes diffusing the gas with at least a portion of the produced water to produce a gas/liquid mixture. The method further includes providing the gas/liquid mixture to a reaction vessel to allow the at least one in-situ chemical species of the gas/liquid mixture to react with the carbon dioxide of the gas/liquid mixture to form the at least one reaction product, wherein the at least one reaction product settles at a lower level in the reaction vessel.

In some embodiments, the method further includes adding a reaction promoter to the gas/liquid mixture prior to providing the gas/liquid mixture to the reaction vessel. In various embodiments, the produced water further includes a hydrocarbon, and wherein an upper level is formed in the reaction vessel that includes the hydrocarbon provided in the produced water, and wherein the at least one reaction product at the lower level is below the upper level. In some embodiments, the upper level further includes a floating floc, and wherein the at least one reaction product forms after a suitable dwell time. In various embodiments, a middle level of treated water is formed in the reaction vessel, and wherein the middle level is positioned below the upper level and above the lower level. In some embodiments, the middle level is contiguous with the upper level. In various embodiments, the method further includes providing the treated water from the middle level of the reaction vessel, wherein the treated water includes reduced hydrocarbons and at least some reduced in-situ species as compared to the produced water. In some embodiments, the method further includes providing the at least one reaction product from the reaction vessel to a solid handling system, and wherein a portion of the treated water is provided to assist with diffusing the gas with at least the portion of the produced water to produce the gas/liquid mixture. In various embodiments, a gas level is formed in the reaction vessel that is positioned above the upper level. In some embodiments, the at least one in-situ chemical species includes calcium, magnesium, barium, or strontium. In various embodiments, the at least one reaction product at the lower level in the reaction vessel is a slurry including a combination of solid and liquid of the at least one reaction product.

Some embodiments relate to a method of carbon dioxide sequestration using at least one in-situ chemical species in produced water provided by hydrocarbon production to produce at least one reaction product that sequesters carbon dioxide. The method includes providing a gas including carbon dioxide to a reaction vessel. The method further includes providing produced water from the hydrocarbon production to the reaction vessel, wherein the produced water includes the at least one in-situ chemical species. The method further includes diffusing, in the reaction vessel, the gas with at least a portion of the produced water to allow the at least one in-situ chemical species of the produced water to react with the gas to form the at least one reaction product, wherein the at least one reaction product settles to a lower portion of the reaction vessel.

In some embodiments, the method further includes adding a reaction promoter to the reaction vessel, wherein an upper level is formed in the reaction vessel that includes a hydrocarbon provided in the produced water, and wherein an intermediate level of treated water is formed in the reaction vessel, and wherein the intermediate level is positioned below the upper level and above a lower level.

Figure 1:
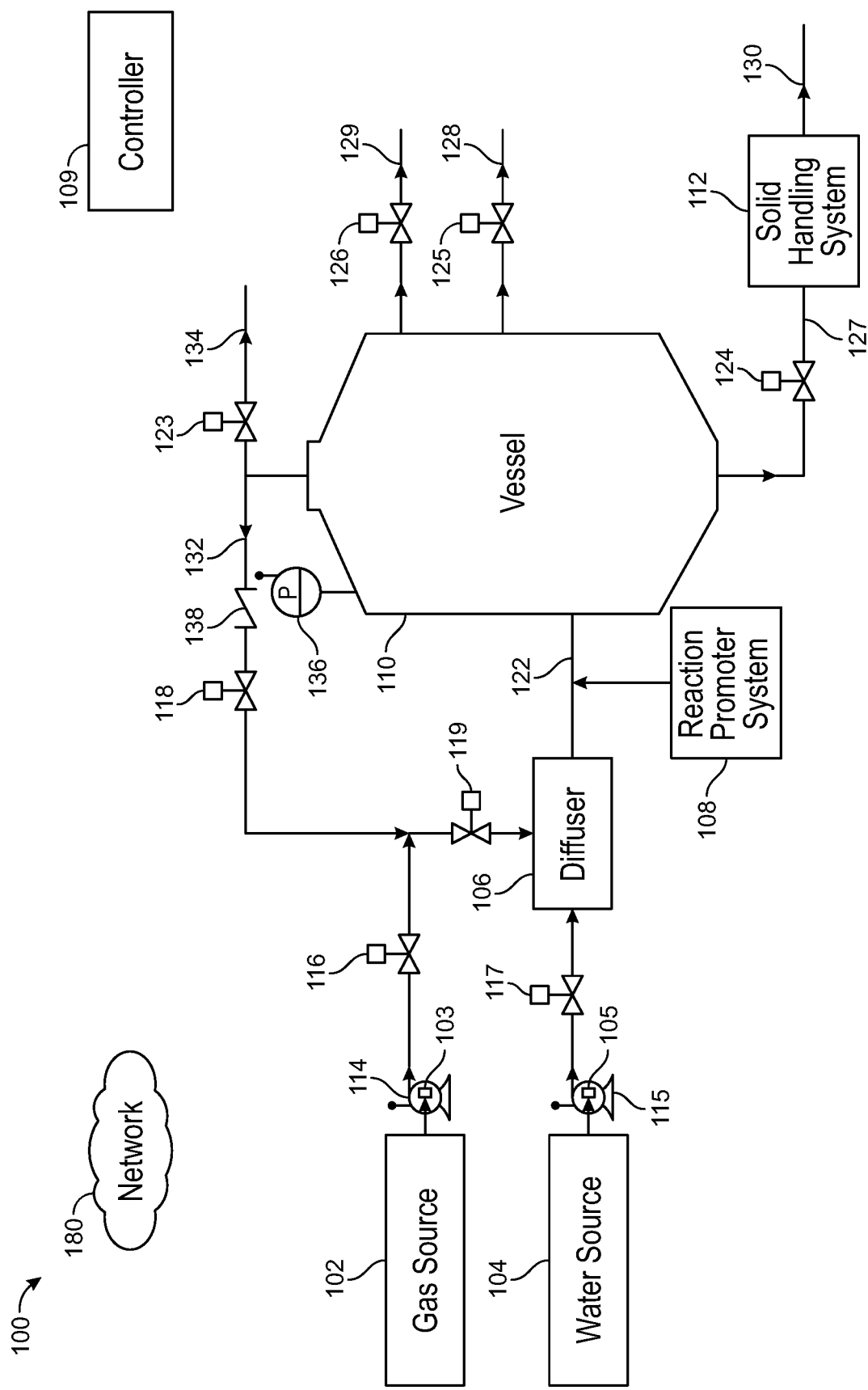
FIG. 1 is a block diagram depicting an implementation of a sequestering system for sequestering carbon dioxide, according to an illustrative implementation.

It will be recognized that some or all of the figures are schematic representations for purposes of illustration. The figures are provided for the purpose of illustrating one or more embodiments or implementations with the explicit understanding that they will not be used to limit the scope or the meaning of the claims.

DETAILED DESCRIPTION

Referring generally to the figures, disclosed herein is systems and methods capable of sequestering carbon dioxide ($CO_2$) and treating water. In particular, the systems and methods relate to carbon dioxide sequestration using at least one in-situ chemical species in water to produce at least one reaction product that sequesters carbon dioxide. In some embodiments, carbon dioxide (e.g., from a carbon dioxide source) and water (e.g., from a water source) can be utilized by the systems and methods described herein to sequester carbon dioxide and treat the water such that it can be reused. In particular, during the sequestration process, carbon dioxide gas can be diffused with water (e.g., wastewater generated from industrial activities, rainwater runoff, and/or human activities) to allow at least one in-situ chemical species of the water to react with the carbon dioxide gas to form at least one reaction product. That is, the ions of the at least one in-situ chemical species can react with the carbon dioxide molecules of the carbon dioxide gas to form a carbonate sludge or compound. In some implementations, a reaction promoter (or catalyst) (e.g., metallic ions, oxidized gasses or liquids, acids, bases, etc.) may also be provided to improve the performance of the chemical reaction. Additionally, the water/gas mixture can be provided to a vessel, such that the at least one reaction product, one or more by-products, one or more side-products, and/or one or more unreacted elements, compounds, or molecules can form one or more levels within the vessel.

In many systems, capturing carbon dioxide gas (e.g., produced from power plants, cement production, industrial processes) or processing wastewater (e.g., produced water from hydrocarbon exploration and production) can be a capital and energy intensive process. Additionally, stringent regulations regarding the use and/or disposal of carbon dioxide and wastewater may require additional processes that can be uneconomical and/or inefficient. Further, in remote locations, such as in hydrocarbon (e.g., oil and gas) exploration and production, capturing carbon dioxide gas and/or processing produced water (e.g., wastewater) can include additional challenges due to limited disposal options (e.g., deep well injection, frac tanks, etc.), transportation costs, and logistical constraints. Alternatively, water produced from other human activities, such as but not limited to mining, energy, transportation, and manufacturing, can also be utilized in the following systems and methods to sequester carbon dioxide, and treat provided water.

As used herein, a "level" in the vessel (sometimes referred to herein as a "separation tank") can be a classification based on densities and/or concentrations of various contents (e.g., elements and/or compounds of the mixture) within the vessel. In particular, while some levels may be miscible and/or immiscible based on the miscibility properties, the concentration of one or more elements and/or compounds when sampled can be used to determine levels in a vessel. For example, if a first sample of an area within the vessel is taken that is 10% carbon precipitate and 90% aqueous solution, it may be categorized as part of the lower level, whereas if a second sample of an area within the vessel is taken that only includes 1% carbon precipitate and 99% aqueous solution, it may be categorized as part of the intermediate level. In the following example, the concentration (sometimes inherently the density) of a precipitate may be utilized in determining the level. In another example, oil and/or floc (flocculants) from hydrocarbons may be immiscible from an aqueous solution and can be categorized as the upper level, and/or the level contiguous and above the intermediate level. In another example, a gas level (e.g., un-reacted carbon dioxide gas, sulfur gas, methane gas ($CH_4$), etc.) may form at the top of the vessel because the gases (or gas mixture) may have the lowest densities of all the contents within the vessel.

As used herein, a "carbon dioxide gas" may be any gas mixture with a concentration of carbon dioxide. In some embodiments, the carbon dioxide gas may be carbon dioxide rich, such that the concentration of carbon dioxide is at least 1% by volume of the gas mixture (or 10,000 ppm). Generally, a carbon dioxide rich gas can have a greater percentage by volume of carbon dioxide than typical carbon dioxide levels in outdoor air (e.g., 0.03%-0.09%, or 300-900 ppm).

As used herein, a "carbonate sludge" may be a combination of solids and liquids including at least a carbonate precipitate within an aqueous mixture. In various embodiments, the carbonate precipitate can form after a chemical reaction occurs. In some embodiments, the carbonate sludge may contain more liquid than solid by percentage.

As used herein, "produced water" may be any water that is returned to the surface through a well borehole such as, for example, during hydrocarbon exploration and production (e.g., fracking), or while drilling other wells or boreholes. The produced water can be the water injected during hydrocarbon exploration, well completion, and production, as well as natural formation water within the earth. In particular, the chemical makeup of the produced water can include various hydrocarbons, metals, compounds, and naturally occurring elements (hereafter referred to as "in-situ chemical species"). In some embodiments, the produced water may have a high salinity with various contaminants that could be detrimental if reused and may have stringent regulations regarding disposal. That is, the in-situ chemical species of produced water can include, but is not limited to, chloride (Cl), calcium (Ca), magnesium (Mg), strontium (Sr), sulfate ($SO_4$), carbon dioxide ($CO_2$), iron (Fe), manganese (Mn), barium (Ba), hydrogen sulfide ($H_2S$), bicarbonate ($HCO_3$), silver (Ag), selenium (Se), lead (Pb), cadmium (Cd), chromium (Cr), arsenic (As), mercury (Hg), etc. In various implementations, the chemical composition of the in-situ chemical species can be dependent on the geology and sedimentation of the formation utilized in the hydrocarbon exploration and production.

Referring now to FIG. 1, a block diagram depicting an implementation of a sequestering system 100 for sequestering carbon dioxide, according to an illustrative implementation. The sequestering system 100 includes a diffuser 106 configured to diffuse carbon dioxide gas and water (e.g., produced water) to produce a gas/liquid mixture. In some embodiments, the diffuser 106 may be an inline diffuser outside reaction vessel 110 and connected via conduit 122. In various embodiments, the diffuser 106 may be an in-vessel diffuser (e.g., gas bubbler) within reaction vessel 110 (as shown and described in detail with reference to FIG. 3). As shown, conduit 122 can be installed between the diffuser 106 and reaction vessel 110 to ensure the diffused gas/liquid mixture flows into reaction vessel 110.

In some embodiments, diffuser 106 may be any suitable diffuser capable of achieving a desired degree of mixing. For example, the diffuser may include a chamber that is provided carbon dioxide gas (e.g., from gas source 102), and when water is introduced (or provided through) to the chamber (e.g., from water source 104), the carbon dioxide gas can be diffused into the water producing gas bubbles in a gas/liquid mixture. In the following example, the produced gas bubbles can improve the gas-liquid mass transfer efficiency and can help dissolve any soluble portion of the carbon dioxide gas. In one example, the water may be produced water from hydrocarbon production, and the produced water may include one or more in-situ chemical species. In the following example, diffuser 106 can diffuse the carbon dioxide gas into the produced water to produce a gas/liquid mixture.

In some implementations, the diffuser 106 may be any suitable size and shape. In some embodiments, the size and location of the diffuser 106 may be adjusted to achieve optimal performance based on air temperature, gas composition, water composition, including in-situ chemical species and concentration, altitude, humidity, gas-liquid mass transfer efficiency, and other factors.

In operation after the carbon dioxide gas and water are diffused, a reaction promoter may be provided (or introduced) into conduit 122 and/or directly into diffuser 106 (not shown, but may mix utilizing similar techniques described above) via a reaction promoter system 108. That is, as the gas/liquid mixture flows towards the reaction vessel 110, and in certain implementations, a reaction promoter may be provided to improve and/or accelerate one or more chemical reactions in the gas/liquid mixture. In some implementations, the reaction promoter system 108 can determine if and when the reactor promoter should be added based on detecting the concentration of residual carbon dioxide (or unreacted carbon dioxide) in the headspace of vessel 110 (e.g., gas level 408 in FIG. 4). For example, pressure sensor 136 may measure the concentration of residual carbon dioxide in reaction vessel 110. Alternatively, controllable valves 124, 125, and/or 126 can measure the carbon dioxide concentration connected to an outlet of the reaction vessel 110 to determine the reacted carbon dioxide and thus, determine the amount of unreacted carbon dioxide based on the actual or estimated supplied amount of carbon dioxide gas from gas source 102 (e.g., supplied amount—reacted carbon dioxide amount=unreacted carbon dioxide amount). In various implementations, the reaction promoter system 108 can also determine if and when the reactor promoter should be added based on detecting low carbon dioxide efficiency. For example, low carbon dioxide efficiency can be detected by a sensor of reaction promotor system 108 based on sampling the concentration of carbon dioxide gas in the gas/liquid mixture provided in conduit 122 (e.g., where a low carbon dioxide efficiency can be a concentration of carbon dioxide gas greater than 10%, 15%, 20%, 25%, 30%, 35%, 40%, 45%, 50%, or greater, or a range between and including any two of the foregoing values, e.g., at least about approximately 10% to about approximately 50%). That is, a low carbon dioxide efficiency can be indicative of the carbon dioxide gas not reacting with the produced water. Accordingly, a reaction promotor can be added to improve and/or accelerate one or more chemical reactions in the gas/liquid mixture.

In operation, the carbon dioxide gas from a gas source 102 is provided to diffuser 106 using pump 114 (e.g., powered by an engine or motor). The gas source, may include, without limitation, a fresh gas source, or an impaired gas source, such as emission from various human activities, etc. Various valves, such as valve 116 may be provided at the discharge of pump 114. Additionally in operation, the water from a water source 104 is provided to diffuser 106 using pump 115. The water source, may include, without limitation, a fresh water source, or an impaired water source, such as flowback water contained from a prior frac process, or production water, well water, wastewater. etc. Various valves, such as valve 117 may be provided at the discharge of pump 115. The plurality of controllable valves 116-119 can be controlled by controller 109 (which may include a plurality of distributed controllers or a primary controller), and their outputs can be connected (directly or indirectly) to diffuser 106. In various embodiments, additional carbon dioxide gas (e.g., unreacted) may be captured from the reaction vessel 110 and recirculated to diffuser 106, via conduit 132 and controllable valves 118 and 119.

Each of the plurality of pumps (e.g., 114 and 115) may include various sensors (e.g., 103, 105). The pumps can be controlled using a controller 109 (which may be implemented as one or more controllers using any suitable computer or processing device). The sensors (e.g., temperature sensors, pressure sensors, flow meter, chemical sensors, spectrometer, elemental composition sensor, etc.) can be configured to measure attributes of the supplied gas, water, and/or mixtures. For example, the water supplied by water source 104 may be tested by a chemical sensor of pump 115 to determine if the water includes one or more in-situ species. In the following example, if the water does contain one or more suitable in-situ species, the controller 109 may operate valve 117 to allow the water to flow into diffuser 106. It should be understood that the sensors described herein (e.g., 103, 105, FIGS. 2-3, FIGS. 5-6, etc.) can be disposed within the pumps or in-line with the pump (e.g., between pump 114 and valve 116, or pump 115 and valve 117). The pumps can include circuitry or controls to provide their measurement to the controller 109 via a wired or wireless link, such as that illustrated by the antenna adjacent the pumps. In various implementations, the sensors may provide its measurements to the controller 109, where such measurements may be logged and monitored as desired.

Each of the plurality of controllable valves (e.g., 116-119, 123-126) of the sequestering system 100 may be controlled using a controller 109, which receives the level or volume of water, gas, and/or mixture from various systems and/or sources described herein. For example, control valve 124 may receive flowable sludge from reaction vessel 110. In another example, valve 125 may receive treated water from reaction vessel 110. In yet another example, valve 119 may receive carbon dioxide gas from gas source 102 and/or reaction vessel 110 (e.g., unreacted carbon dioxide).

A reaction vessel 110 can include one or more inlets (one shown) that can be flowably coupled via conduit 122 with diffuser 106 and can be configured to receive diffused gas/liquid mixture from diffuser 106. The reaction vessel 110 (or container) can include a capacity to hold a volume of gas/liquid mixture. The reaction vessel 110 may be a tank, basin, or other reservoir or combination thereof. Within the reaction vessel 110, one or more levels may be naturally formed based on the density and concentration of various contents (e.g., elements, compounds, and mixtures). In some implementations, the reaction vessel 110 can be configured to allow one or more chemical reactions to occur. For example, the gas/liquid mixture (e.g., including at least carbon dioxide gas and one in-situ chemical specifies) can undergo a chemical reaction within the vessel where at least one reaction product can form. In the following example, the reaction product (e.g., precipitant) may settle at the lower level of the reaction vessel based on its density. Additionally, the reaction vessel 110 may include a mixer (described in detail with reference to FIG. 2).

The levels of the reaction vessel 110 can form naturally based on natural phenomenon's (e.g., gravity, forces, pressure, flow, density, agitation, movement) and/or chemical phenomenon's (e.g., composition of substances (or mixtures) and their properties and reactions). In some implementations, the one or more levels formed that include one or more elements, compounds, or mixtures, within the reaction vessel 110 may be immiscible. In other implementations not shown herein, an agitator or mixer may be provided as need to provide desired reactions. Additional details regarding the one or more levels is described in detail with reference to FIG. 4.

A pressure sensor 136 (e.g., pressure transducer) can be positioned in or adjacent of the reaction vessel 110, so that a desired pressure is maintained in the reaction vessel 110. The pressure sensor 136 may use any known or available technology for measuring the pressure in reaction vessel 110 (e.g., container or tank). In one implementation of the sequestering system 100, the pressure sensor 136 include circuitry or controls to provide readings to the controller 109 via a wired or wireless link (e.g., network 180), such as that illustrated by the antenna adjacent the pressure sensor 136.

In various implementations, the reaction vessel 110 can include a plurality of output opening (or outlets) each connected to controllable valve. Each of the plurality of controllable valves (e.g., 123-126) can be connected to an outlet of the reaction vessel 110 (e.g., via conduit) and may be controlled (e.g., open and/or closed based on a desired flow rate, volumetric flow rate, dwell time, etc.) by controller 109. The controller 109 may rely on reaction kinetics (e.g., the rate of reaction of one or more chemicals within reaction vessel 110) and/or separation reaction kinetics (e.g., the rate of converting a mixture or solution of chemical substances into two or more distinct product mixtures) to operate the valves.

In some implementations, valve 124 can be provided at a first outlet (or discharge) of a lower wall (e.g., at a lower level) of reaction vessel 110. For example, the valve 124 may be connected and flowably coupled via conduit 127 and could be positioned below the reaction vessel 110, such that denser elements and compounds such as, but not limited to, carbonate precipitate, reaction products, can be discharged when the valve 124 opens to allow a flow. In other words, the conduit 127 is disposed between the reaction vessel 110 and solid handling system 112.

In some implementations, a flowable sludge can be produced by a chemical reaction within the reaction vessel 110. The flowable sludge can be a higher concentration of solid particles as compared to the gas/water mixture entering the reaction vessel 110. For example, one or more reaction within the reaction vessel 110 may produce a flowable sludge having a second concentration of solids, by mass (e.g., a ratio of the mass of undissolved solids divided by the total mass of the fluid), of at least about approximately 1.0% (or 1.25%, 1.5%, 1.75%, 2%, 2.5%, 5.0%, 10.0%, 15.0%, or greater, or a range between and including any two of the foregoing values, e.g., at least about approximately 1.0% to about approximately 15.0%) from a gas/liquid mixture having a first concentration of solids of at most about approximately 0.3%, 0.4%, 0.6%, 0.8% 1.0%, 1.2%, or a range between and including any two of the foregoing values (e.g., at most about approximately 0.3% to about approximately 1.2%, etc.). In other embodiments, the concentration of solids in the flowable sludge and/or the increase in the concentration of solids provided by the reaction may be different. Furthermore, in various implementations, after the flowable sludge is processed by solid handling system 112, the flowable sludge may be an even higher concentration of solid particles as compared to the flowable sludge entering the solid handling system 112.

In various implementations, valve 125 can be provided at a second outlet of a side wall (e.g., at a middle/intermediate level) of reaction vessel 110. For example, valve 125 may be connected and flowably coupled via conduit 128 and can be positioned on the side of the reaction vessel 110, such that aqueous contents (referred to herein as "treated water") such as, but not limited to, treated water with reduced mineral ion levels compared to the produced water provided by the water source 104, can be discharged when valve 125 opens to allow a flow. Additionally, the aqueous content may be reused and/or reintroduced in the sequestering system 100 (described in detail with reference to FIG. 2). Accordingly, the treated water leaving through the second outlet via conduit 128 can be further processed for water reuse or discharged to a surface body of water (e.g., a waterway, etc.).

In some implementations, valve 126 can be provided at a third outlet of a side wall (e.g., at a middle/intermediate level) of reaction vessel 110. For example, valve 126 may be connected and flowably coupled via conduit 129 and can be positioned on the side the reaction vessel 110, such that oils and flocs (e.g., clay particles and polymers that have been flocculated to form floc), can be discharged when the valve 126 opens to allow a flow. Accordingly, the oil and floc leaving through the third outlet via conduit 129 can be further processed for reuse or discharged for proper disposal (e.g., floc tank).

As shown, the solid handling system 112 can be provided at the discharge of valve 124. Generally, the solid handling system 112 may be any suitable system capable of achieving a desired liquid volume (or liquid-to-solid ratio) from the received mixture. In some implementations, the solid handling system 112 can be configured to process the various contents (e.g., compounds, elements, and/or mixtures) received from the lower level of reaction vessel 110. For example, the solid handling system 112 can be a dewatering system configured to remove water and/or other liquids from the received mixture. The various contents can include carbonate precipitate that can be considered sequestered carbon dioxide gas. Accordingly, the reduced liquid volume mixture leaving the solid handling system 112 including sequestered carbon dioxide can be further processed for storage, disposal, and/or mineral reuse In some implementations, valves 118 and 123 can be provided at a fourth outlet (or discharge) of an upper wall (e.g., at a gas level) of reaction vessel 110. For example, the valves may be connected and flowably coupled via conduit (e.g., 132 and 134) and could be positioned above the reaction vessel 110, such that the least dense contents (e.g., gases) such as, but not limited to, unreacted carbon dioxide, and/or volatile organic compounds (VOCs), can be discharged when either of the valves open to allow a flow. Check valve 138 can be provided between conduit 132 and valve 118 to ensure a one way flow of contents (e.g., from reaction vessel 110 to valve 118). Accordingly, the gasses leaving through the fourth outlet via conduit 134 and/or conduit 132 can be further processed for reuse or discharged for proper disposal (e.g., distillation, fuel burning). In some implementations, valves 118 and 123 can include sensors that can be configured to provide carbon dioxide measurements to controller 109. In turn, the controller 109, in real-time can analyze the carbon dioxide measurements to determine reaction rate, reaction yield, limiting reagents, excess reagents, etc. In one example, upon determining (e.g., by controller 109) that there is excess carbon dioxide gas, the controller 109 may operate valve 118 to allow excess carbon dioxide gas to be recirculated and flow into diffuser 106. In various implementations, controller 109 may also analyze various other measurements (e.g., precipitant collected) from various other systems described herein (e.g., solid handling system 112) to determine reaction rate, reaction yield, limiting reagents, excess reagents, etc. Further, controller 109 may serve to take periodic readings to store or log information concerning the operation of sequestering system 100.

The controller 109 may reside locally or at a remote location and may include one or more processors communicably coupled to one or more memory or memory devices. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

The controller 109 can be configured, in one implementation, to periodically store operational readings (e.g., flow volume of conduit 127, flow rate of conduit 128, concentration of carbon dioxide from the carbon dioxide gas supplied by gas source 102, in-situ specifies of water supplied by water source 104, etc.) of the sequestering system 100 to generate a historical log or operations database of the activity of the sequestering system 100. This may include data wirelessly telemetered, or provided through a network or wired connection, and which may be displayed on one or more screens (e.g., display 935 of FIG. 9) of controller 109. The data may include the flow of gas/liquid mixture into reaction vessel 110 via conduit 122, the volume associated with each level of reaction vessel 110, the concentration of various levels of reaction vessel 110, the flow of each of the plurality of controllable valves 116-119 and 123-126, the flow of water from the water source 104, the flow as provided at the discharge of one or more pumps (e.g., 114-115) as described herein, as well as solid handling system 112 and diffuser 106 operational data, and the like.

The controller 109, in some implementations, is configured to control the openings of each of the plurality of controllable valves 116-119 and 123-126 by using one or more of a plurality of control modes. In one embodiment, a setpoint is provided to control the flow (of gas, liquid, and/or gas/liquid mixture) of each of the plurality of controllable valves 116-119 and 123-126 that may be the same or different for each of the plurality of controllable valves 116-119 and 123-126. This may be referred to as an individual control mode. A communications link (e.g., network 180) between the controller 109 and any system or device described herein, may be provided using any known or available wireless and/or wired communications channel, link, or path (e.g., the Internet, LAN, WAN, etc.).

Figure 2:
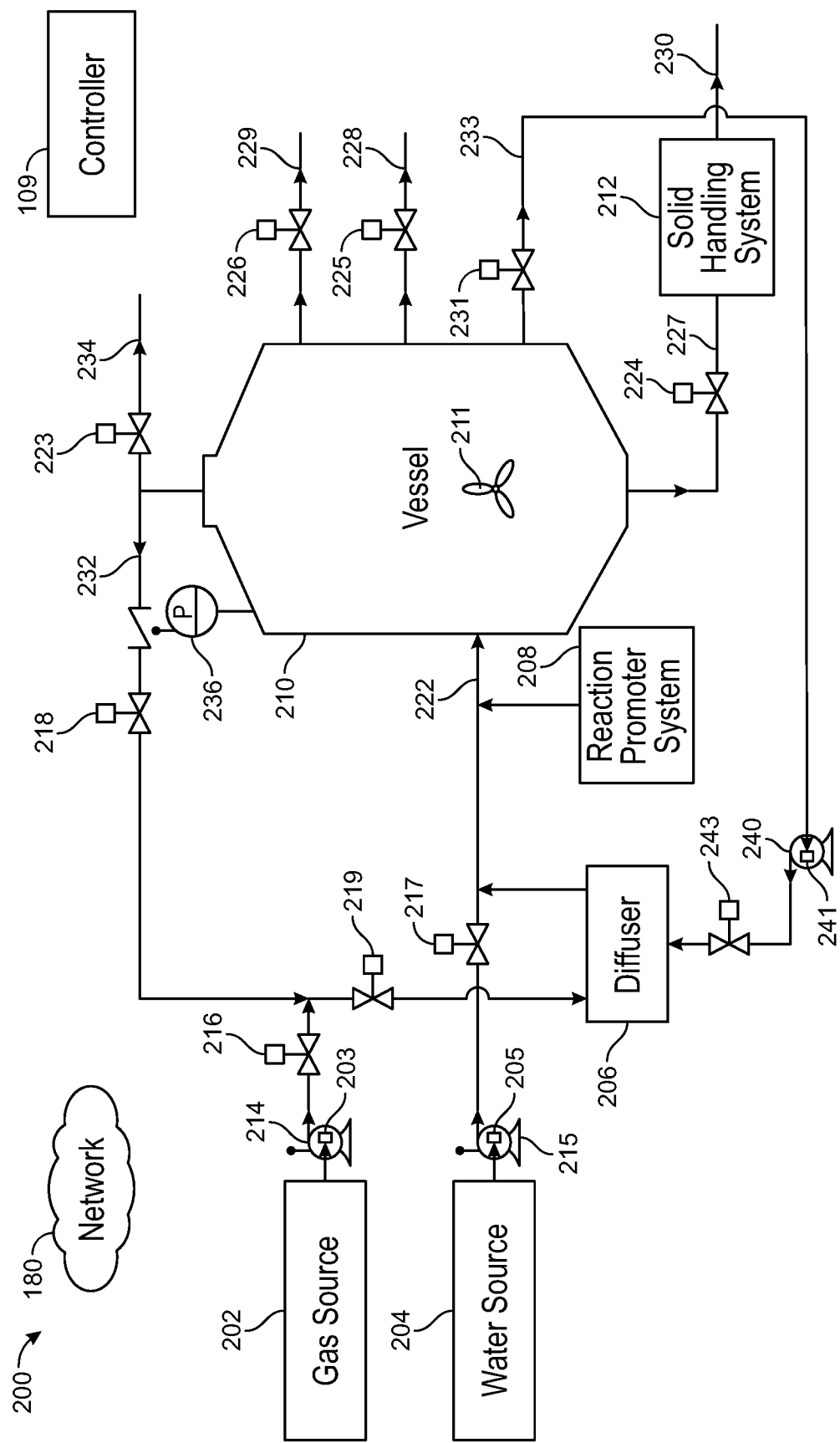
FIG. 2 is a block diagram depicting an implementation of another sequestering system for sequestering carbon dioxide with recirculation, according to an illustrative implementation.

Referring now to FIG. 2, a block diagram depicting an implementation of another sequestering system 200 for sequestering carbon dioxide with recirculation, according to an illustrative implementation. The sequestering system 200 resembles similar features and functionality, described in detail with reference to FIG. 1, in particular gas source 202 (102), water source 204 (104), sensors 203, 205, 236 (103, 105, 136), diffuser 206 (106), reaction promoter system 208 (108), controller 109, reaction vessel 210 (110), solid handling system 212 (112), pumps 214-215 (114-115), valves 216-219 and 223-226 (116-119, 123-126), conduit 222, 227-230, 232, 234 (122, 127-130, 132, 134), and network 180.

However, as shown, in some implementations, sequestering system 200 can include the addition of valves 231 and 243, conduit 233, pump 240, sensor 241 (collectively referred to herein as a "treated water recirculation loop"), and a mixer 211. The treated water recirculation loop can be disposed between the reaction vessel 110 and diffuser 206. In various implementations, valve 231 can be provided at a fifth outlet of a side wall (e.g., at a middle/intermediate level) of reaction vessel 210. In one example, the fifth outlet may be below the second outlet on the side wall with reference to FIG. 1. In another example, the fifth outlet may be above the second outlet on the side wall with reference to FIG. 1. Valve 231 may be connected and flowably coupled via conduit 233 and can be positioned on the side of the reaction vessel 210, such that aqueous contents (referred to herein as "treated water") such as, but not limited to, treated water with reduced mineral ion levels compared to the produced water provided by the water source 104, can be discharged when valve 231 opens to allow a flow.

In operation, the treated water can be provided to diffuser 206 using pump 240 (e.g., powered by an engine). Various valves, such as valve 243 may be provided at the discharge of pump 240 and disposed between pump 240 and diffuser 206. Valves 231 and 243, and pump 240 (e.g., in particular based on sensor measurements of sensor 241) can be controlled by controller 109, and their outputs can be connected (directly or indirectly) to diffuser 206. For example, sensor 241 or valve 231 may provide concentration measurements of the treated water. In the following example, the controller 109 may determine that the concentration of in-situ mineral ions is above or below a predetermined threshold and in turn, operate pump 240 and open valve 243 to provide the treated water to diffuser 206. Alternatively, the treated water may be provided directly to reaction vessel 210 and the water source 204 may be provided to diffuser 206 (e.g., as shown in FIG. 1). In some implementations, both the treated water and water source 204 may be provided to diffuser 206. In some implementations, diffuser 206 will introduce the treated water to the chamber of carbon dioxide gas to allow the carbon dioxide gas to diffuse into the treated water producing gas bubbles in a gas/liquid mixture.

The reaction vessel 210 can also include a mixer 211 disposed at least partially within the reaction vessel 210. As shown, the mixer 211 is disposed proximate to a lower level of the reaction vessel 210. In other embodiments, the location of the mixer 211 may be different, for example, the mixer 211 may be positioned near a side wall, a top wall, or only partially submerged below a waterline of the reaction vessel 210, other positions. The mixer 211 can be configured as one or more mixers to mix, agitate, or otherwise perturb the contents of the reaction vessel 210. For example, the mixer 211 may be a turbine, a shaft rotating a set of paddles, or another mechanical mixing device. Although mixer 211 is shown and described with reference to FIG. 2, it should be understood that any sequestering system described herein may include mixer 211 within one or more areas of the reaction vessel 110. Additionally, while one mixer 211 is shown, it is to be understood that such depicted architectures are merely exemplary and one or more mixers (e.g., mixer A, mixer B, mixer C) may be disposed within the reaction vessel 210.

Figure 3:
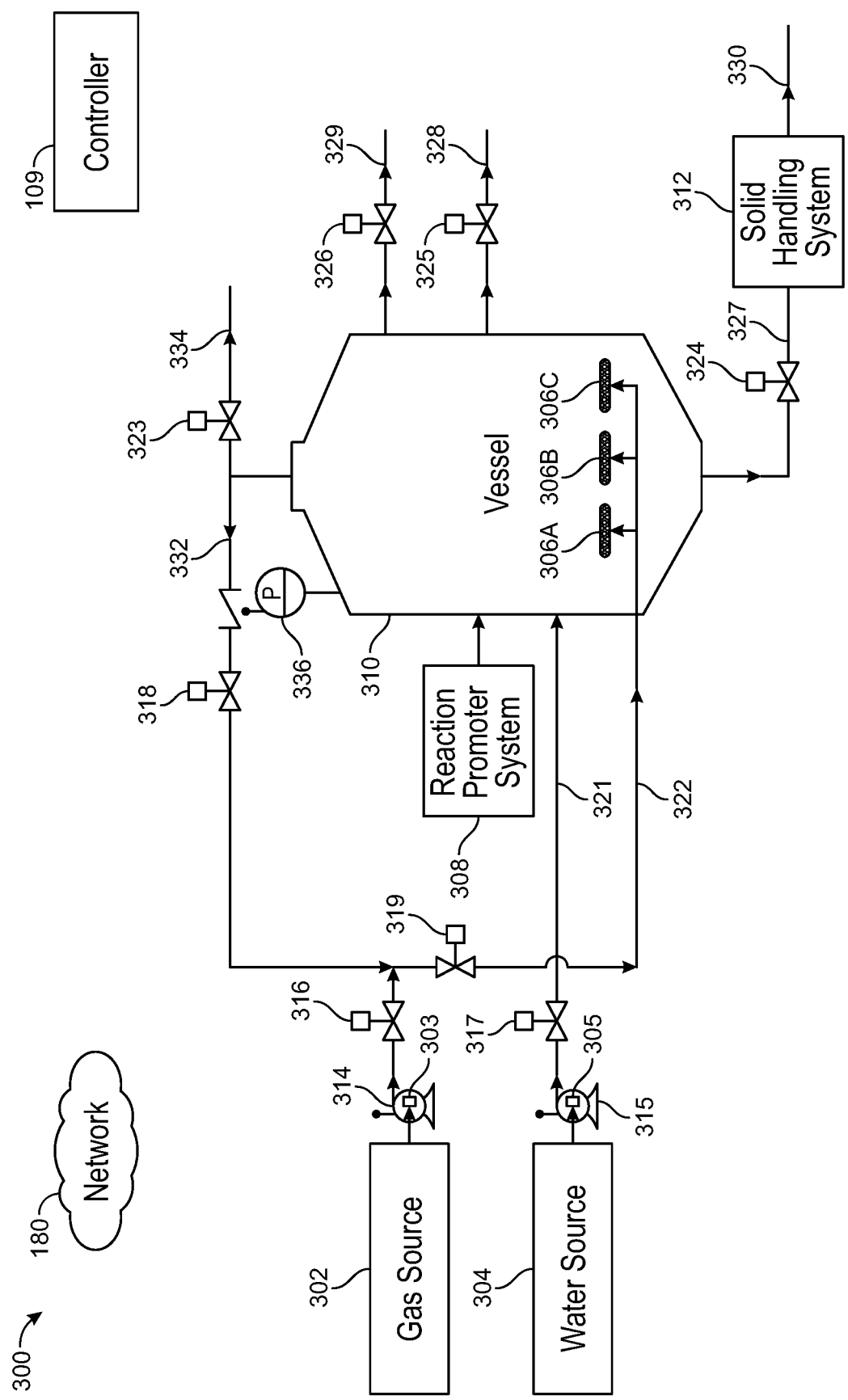
FIG. 3 is a block diagram depicting an implementation of another sequestering system for sequestering carbon dioxide, according to an illustrative implementation.

Referring now to FIG. 3, a block diagram depicting an implementation of another sequestering system 300 for sequestering carbon dioxide, according to an illustrative implementation. The sequestering system 300 resembles similar features and functionality, described in detail with reference to FIG. 1, in particular gas source 302 (102), water source 304 (104), sensors 303, 305, 336 (103, 105, 136), reaction promoter system 308 (108), controller 109, reaction vessel 310 (110) solid handling system 312 (112), pumps 314-315 (114-115), valves 216-219 and 223-226 (116-119, 123-126), conduit 227-230, 232, 234 (122, 127-130, 132, 134), and network 180.

However, as shown, in some implementations, sequestering system 300 can include the addition of diffusers 306A-306C and conduit 321 and 322. In particular, instead of an inline diffuser (as shown with reference to FIG. 1), diffusers 306-306C may be disposed at least partially within the reaction vessel 310 (referred to herein as an "in-vessel diffuser"). Each diffuser can provide carbon dioxide gas to the vessel via conduit 322 and controllable valves 316 and 319. As shown, conduit 322 can be installed between the gas source 302 and reaction vessel 310 to ensure the carbon dioxide gas flows (e.g., using pump 314) into reaction vessel 310. In various embodiments, additional carbon dioxide gas (e.g., unreacted) may be captured from the reaction vessel 310 and recirculated to the diffusers 306-A-306C, via conduit 322 and controllable valves 318-319.

In some embodiments, diffusers 306A-306C may be any suitable diffuser capable of achieving a desired degree of mixing. For example, the diffuser may include a chamber that includes carbon dioxide gas (e.g., from gas source 102), and when provided to reaction vessel 310 (e.g., submerged in produced water provided by water source 304), the carbon dioxide gas can be diffused into the water producing gas bubbles to form a gas/liquid mixture. Furthermore, as shown, the water source 304 may provide water directly to reaction vessel 310, via conduit 321 and valve 317. In operation, the water from a water source 304 is provided to reaction vessel 310 using pump 315. In some implementations, the diffusers 306A-306C may be any suitable size and shape and the size and location of diffusers 306A-306C may be adjusted to achieve optimal performance based on air temperature, altitude, humidity, gas-liquid mass transfer efficiency, and other factors. In particular, while a plurality of diffusers is shown, it is to be understood that such depicted architectures are merely exemplary, and a various number of diffusers may be disposed within reaction vessel 310.

In one embodiment, the location of each of 306A, 306B, and 306C may be disposed proximate to a lower level of the reaction vessel 310, such that the carbon dioxide gas can rise and react with the water provided from water source 304 to form at least one reaction product. In a conceptual sense, any arrangement of diffusers to achieve the same functionality is effectively "associated" such that the desired functionality is achieved. That is, similar chemical reactions can occur in reactor vessel 310 to form at least one reaction product.

Additionally, in operation after the carbon dioxide gas and water are diffused, a reaction promoter may be provided (or introduced) directly into reaction vessel 310 via a reaction promoter system 308. That is, as the gas/liquid mixture react within the reaction vessel 310, and in certain implementations, a reaction promoter may be provided to accelerate one or more chemical reactions in the gas/liquid mixture.

Figure 4:
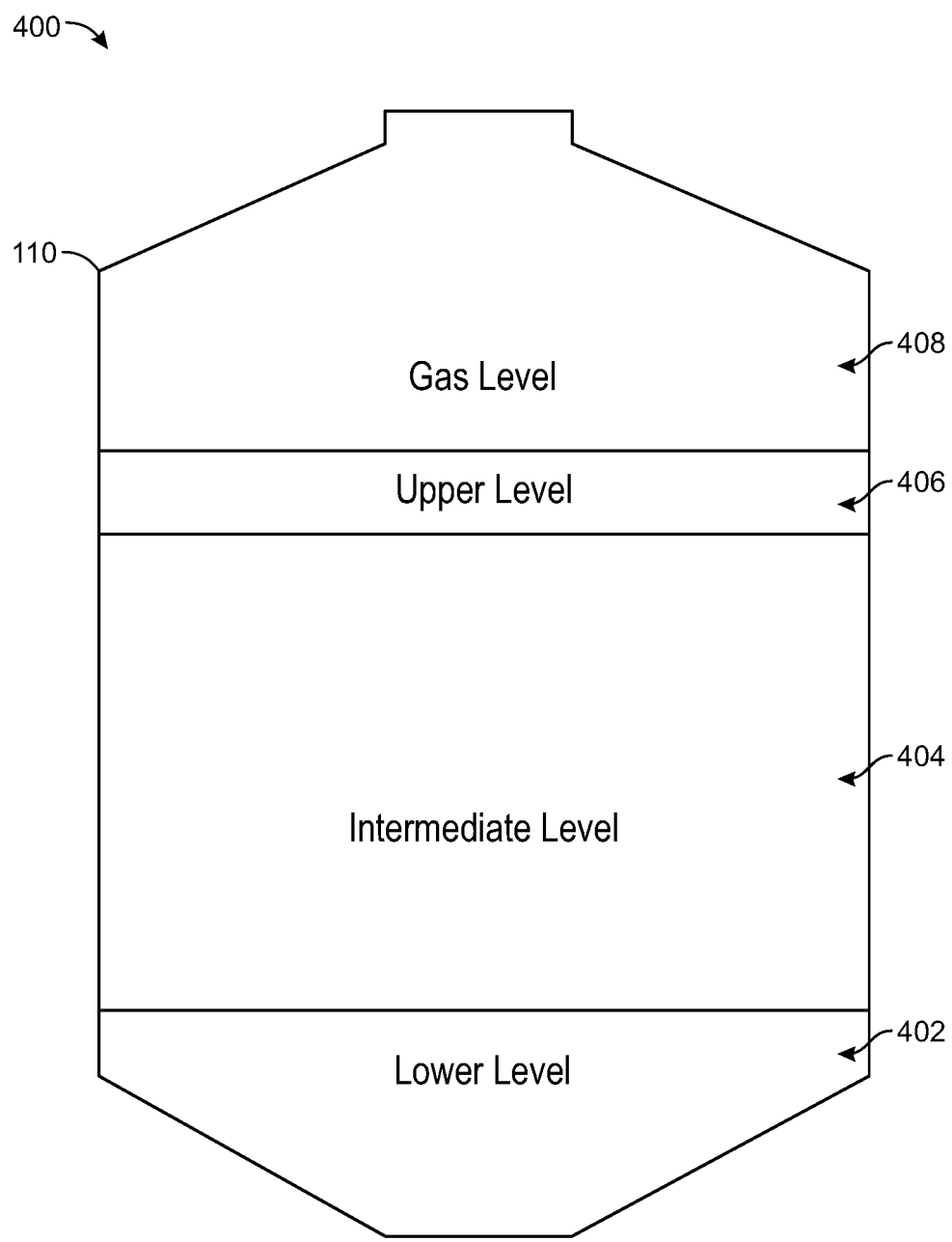
FIG. 4 is a block diagram depicting an example illustration of a reaction vessel in connection with the sequestering system for sequestering carbon dioxide shown in FIGS. 1-3, according to an illustrative implementation.

Referring now to FIG. 4, a block diagram depicting an example illustration of a reaction vessel 400 in connection with the sequestering system for sequestering carbon dioxide shown in FIGS. 1-3, according to an illustrative implementation. In various implementations, one or more levels can be formed based on chemical reaction within the reaction vessel 110 (as described in detail with reference to FIG. 1). The one or more levels may be miscible but may have one or more unique properties (e.g., concentration of one or more elements and/or compounds when sampled) that allow a level to be unique from a different level. For example, a lower level may be defined as the area within the reaction vessel 110 that contains a certain concentration of content (e.g., one or more elements or compounds such as, but not limited to, calcium carbonate, magnesium carbonate, etc.). In the following example, an intermediate level (or middle level) may be defined as the area within the reaction vessel 110 that contains a certain concentration of water ($H_2O$). As discussed, the intermediate level and lower level could naturally be overlapping based on the one or more unique properties, such that what could be considered the lower level is also considered the intermediate level.

Accordingly, levels can overlap, such that an area of the reaction vessel that could be considered part of one level, could also considered part of another level, even though each level can have one or more unique properties. Although various levels are shown and described herein, it should be understood that any number or levels may be defined, depending on one or more unique properties of the content (e.g., elements, compounds, and mixtures) within one or more areas of the reaction vessel 110.

According to an exemplary embodiment and as shown, a gas level 408 (e.g., the head space of reaction vessel 110) can form at the top of reaction vessel 400 that can include, but is not limited to, unreacted carbon dioxide, VOCs, and other gasses. An upper level 406 can form below the gas level 408 that can include oils and flocs. In one implementations, the upper level 406 may be immiscible with intermediate level 404. In some implementations, the water provided may not contain oil and/or flocculation may not occur, such that the upper level 406 may not be present. Furthermore, an intermediate level 404 can form below the upper level 406 and can include an aqueous mixture (referred to herein as treated water) with various in-situ mineral ions. In some implementations, the provided water from water source 104 in FIG. 1 may contain a greater concentration of in-situ mineral ions than after the water reacts with the carbon dioxide gas within the reaction vessel 410. Accordingly, the treated water can have reduced in-situ mineral ions and reduced hydrocarbon content, thereby reducing scaling and buildup. Moreover, a lower level 402 can form below the intermediate level 404 and can include one or more reaction products (e.g., precipitates), such as calcium carbon and magnesium carbonate.

Figure 5:
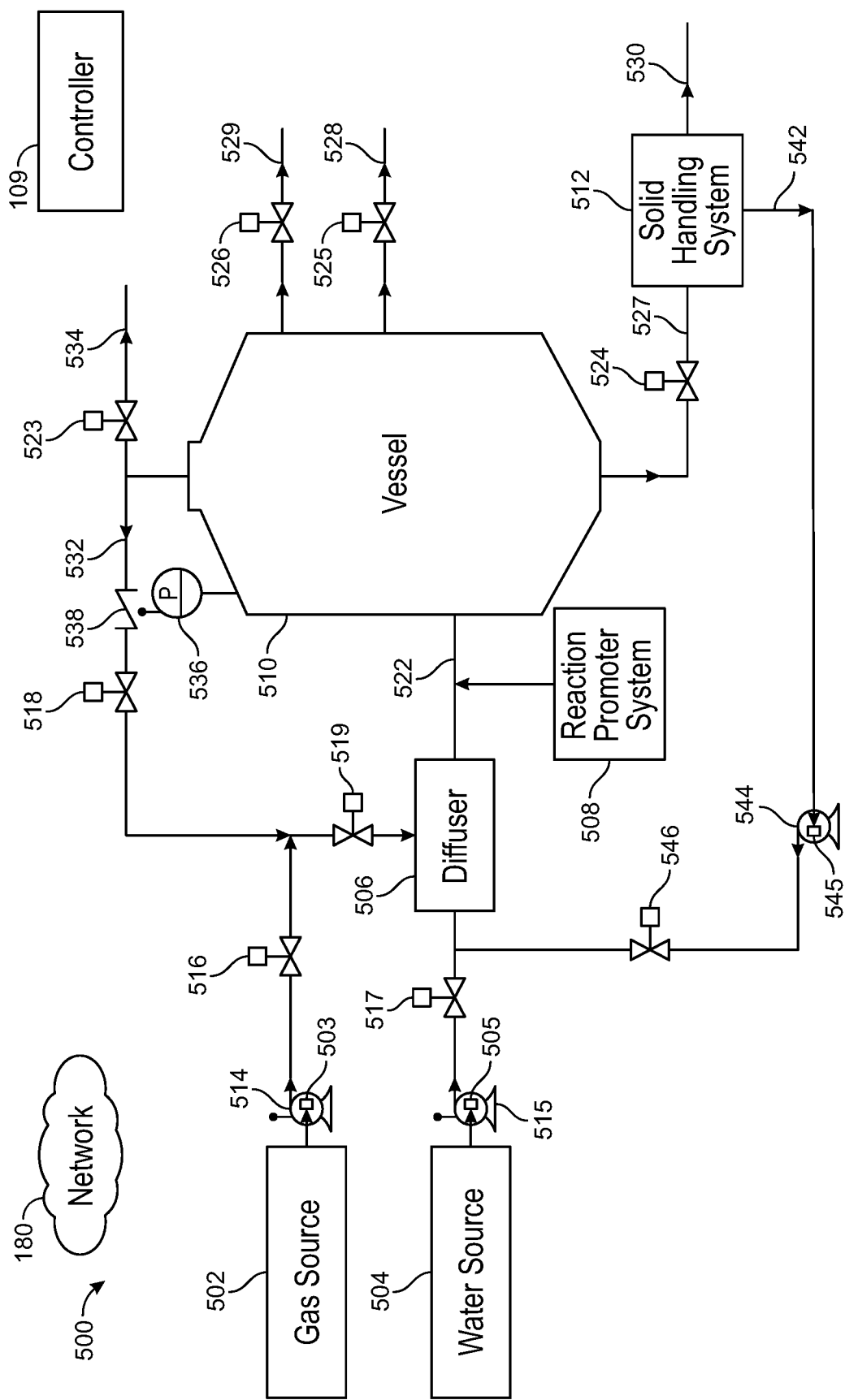
FIG. 5 is a block diagram depicting an implementation of another sequestering system for sequestering carbon dioxide with recirculation, according to an illustrative implementation.

Referring now to FIG. 5, a block diagram depicting an implementation of another sequestering system 500 for sequestering carbon dioxide with recirculation, according to an illustrative implementation. The sequestering system 500 resembles similar features and functionality, described in detail with reference to FIG. 1, in particular gas source 502 (102), water source 504 (104), sensors 503, 505, 536 (103, 105, 136), diffuser 506 (106), reaction promoter system 508 (108), controller 109, reaction vessel 510 (110), solid handling system 512 (112), pumps 514-515 (114-115), valves 516-519 and 523-526 (116-119, 123-126), conduit 522, 527-530, 532, 534 (122, 127-130, 132, 134), and network 180.

However, as shown, in some implementations, sequestering system 500 can include the addition of conduit 542, pump 544, sensor 545, and valve 546 (collectively referred to herein as a "de-watered recirculation loop"). The de-watered recirculation loop can be disposed between the solid handling system 512 and diffuser 506. That is, solid handling system 512 and diffuser 506 can be flowable coupled via conduit 542, such that aqueous content removed from the flowable sludge received by the solid handling system 512 can be reused.

In operation, the aqueous mixture from de-watering the flowable sludge can be provided to diffuser 506 using pump 544 (e.g., powered by an engine). In other implementations not shown, the de-watering product may be provided in or adjacent the reaction vessel 510. Various valves, such as valve 546 may be provided at the discharge of pump 544 and disposed between pump 544 and diffuser 506. Valve 546 and pump 544 (e.g., in particular based on sensor measurements of sensor 545) can be controlled by controller 109, and their outputs can be connected (directly or indirectly) to diffuser 506. For example, sensor 545 or valve 546 may provide concentration measurements of in-situ mineral ions present in the aqueous mixture. In the following example, the controller 109 may determine that the concentration of in-situ mineral ions is above or below a predetermined threshold and in turn, operate pump 544 and open valve 546 to provide the aqueous water (or treated water) to diffuser 506. In some implementations, diffuser 506 will introduce the treated water to the chamber of carbon dioxide gas to allow the carbon dioxide gas to diffuse into the treated water and/or water provided by water source 504 to produce gas bubbles in a gas/liquid mixture.

Figure 6:
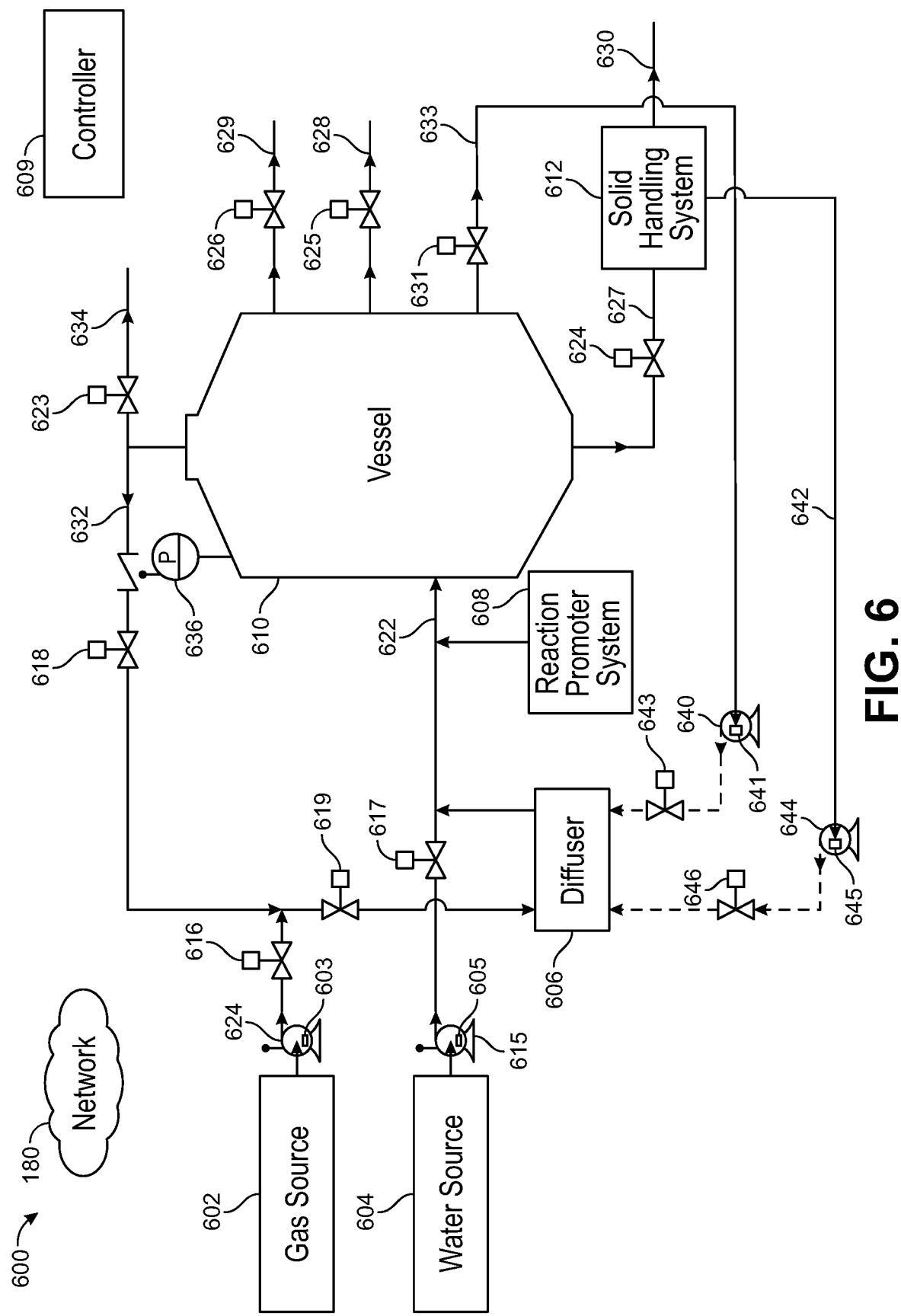
FIG. 6 is a block diagram depicting an implementation of another sequestering system for sequestering carbon dioxide with recirculation, according to an illustrative implementation.

Referring now to FIG. 6, a block diagram depicting an implementation of another sequestering system 600 for sequestering carbon dioxide with recirculation, according to an illustrative implementation. The sequestering system 600 resembles similar features and functionality, described in detail with reference to FIGS. 1, 2, and 5, in particular gas source 602 (102), water source 604 (104), sensors 603, 605, 636, 641, 645 (103, 105, 136, 241, 545), diffuser 606 (106), reaction promoter system 608 (108), controller 109, reaction vessel 610 (110), solid handling system 612 (112), pumps 614-615, 640, 644 (114-115, 240, 544), valves 616-619, 623-626, 643, 646 (116-119, 123-126, 243, 546), conduit 622, 627-630, 632, 633, 634, 642 (122, 127-130, 132, 134, 233, 542), and network 180. However, as shown, in some implementations, sequestering system 600 can include three inlets (or inputs, shown as dotted lines) into diffuser 606 including the treated water recirculation loop and de-watered recirculation loop with reference to FIG. 2 and FIG. 5 respectively. In some implementations, the one or more of the inlets from the treated water recirculation loop and de-watered recirculation loop may be removed. Accordingly, the dotted lines can be indicative of optional configuration for sequestering system 600 that can be customized based on the chemical composition of the in-situ chemical species (e.g., such as can the geology and sedimentation of the formation utilized in the hydrocarbon exploration and production) and/or the application (e.g., oil and gas, mining, energy, transportation, and manufacturing).

Figure 7:
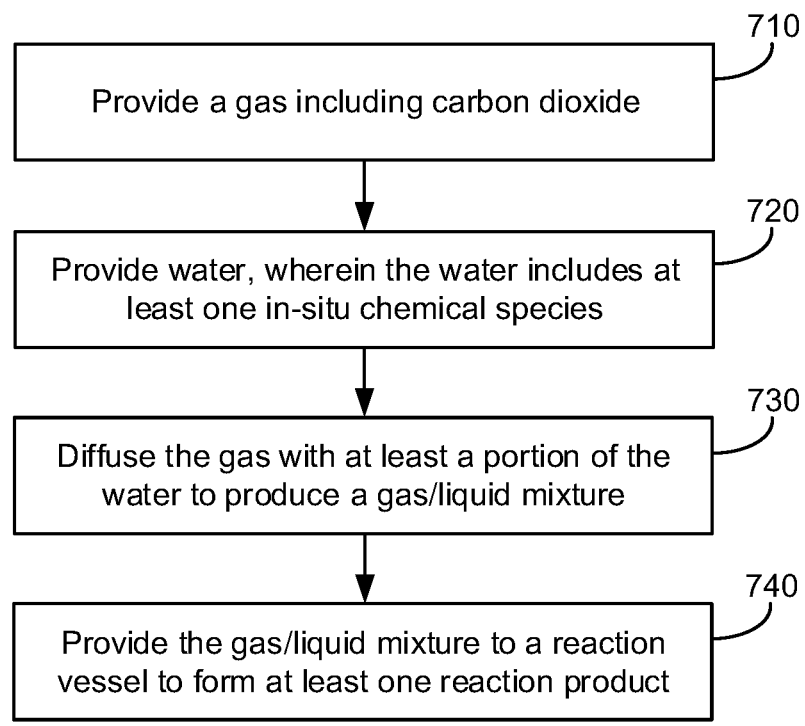
FIG. 7 is a flowchart for a method of carbon dioxide sequestration, according to an illustrative implementation.

Referring now to FIG. 7, a flowchart for a method 700 of carbon dioxide sequestration, according to an illustrative implementation. Method 700 may be implemented with the sequestration systems of FIGS. 1-3 and 5-6. Accordingly, method 700 may be described with regards to FIGS. 1-3 and 5-6. Although the method 700 of FIG. 7 is described with reference to carbon dioxide gas and produced water, it will be appreciated that similar operations may be used to treat any water; in particular, wastewater from various human activities, well water, or other water with desired compounds or in-situ compound(s).

In broad overview of method 700, at block 710, the sequestering system can provide a gas including carbon dioxide. At block 720, the sequestering system can provide water, wherein the water includes at least one in-situ chemical species. At block 730, the sequestering system can diffuse the gas with at least a portion of the water to produce a gas/liquid mixture. At block 740, the sequestering system can provide the gas/liquid mixture to a reaction vessel to form at least one reaction product. In other embodiments, the method 700 may include additional, fewer, and/or different operations may be performed depending on the particular. In some embodiments, each operation may be re-ordered, added, removed, or repeated.

Referring to method 700 in more detail, at block 710 the sequestration system can provide (e.g., by pump 114 and/or valve 116) a gas including carbon dioxide. The gas can be provided to a diffuser, such as diffuser 106 in FIG. 1. The gas can include carbon dioxide and/or additional gasses from human activities and/or the atmosphere. In some implementations, the carbon dioxide is from a remote source (or location) and is pumped to the sequestration system described herein.

At block 720, the sequestration system can provide (e.g., by pump 115 and/or valve 117) produced water from the hydrocarbon production, wherein the produced water includes the at least one in-situ chemical species (e.g., calcium, magnesium, barium, strontium, chloride, etc.). In some implementations, the produced water can include a hydrocarbon. The produced water can be provided to a diffuser, such as diffuser 106 in FIG. 1. In some implementations, the produced water is from a remote source (or location) and is pumped to the sequestration system described herein.

At block 730, the sequestration system can diffuse (e.g., in diffuser 106) the gas with at least a portion of the produced water to produce a gas/liquid mixture. In one embodiment, the diffuser may be an in-line diffuser positioned upstream from the reaction vessel. In another embodiment, a plurality of diffusers may be positioned within the reaction vessel (referred to herein as in-vessel).

An in-line diffuser can include one or more chamber that can be provided gas and water to allow diffusion through the chambers for any appropriate amount of time, such as 1 second, 1 minute, 10 minutes, 20 minutes, 1 hour, or any other such period at block 730. In particular, in-line diffusers generate a gas/liquid mixture that can allow a chemical reaction. In some embodiments, the chemical reaction is accelerated by the addition of a catalyst (or reaction promoter).

At block 740, the sequestration system can provide the gas/liquid mixture to a reaction vessel (e.g., 110) to allow the at least one in-situ chemical species of the gas/liquid mixture to react with the carbon dioxide of the gas/liquid mixture to form the at least one reaction product, wherein the at least one reaction product settles at a lower level in the reaction vessel. The gas/liquid mixture can be provided through a conduit. In some implementations, an upper level within the reaction vessel can form in the reaction vessel that includes the hydrocarbon provided in the produced water and/or floating floc from flocculation. In various implementations, the at least one reaction product at the lower level can be below the upper level. Additionally, in some implementations, a middle level (or intermediate) of treated water can form in the reaction vessel, such that the middle level can be positioned below the upper level (and is contiguous with the upper level) and above the lower level. In some implementations, a reaction promoter can be provided to the reaction vessel to accelerate one or more chemical reaction of the gas/liquid mixture. Furthermore, the at least one reaction product may form after a suitable dwell time (e.g., instantaneously, 1 millisecond, 1 microsecond, 1 second, 5 seconds, 30 seconds, 1 minute, 5 minutes, 30 minutes, 1 hour, 10 hours, etc.).

In operation, the sequestration system can also provide the at least one reaction product from the reaction vessel to a solid handling system (e.g., 110). The provided at least one reaction product can be part of a slurry including a combination of solid and liquid content. Moreover, the solid handling system can be configured to de-water the at least one reaction product and provide the excess aqueous mixture to the diffuser (e.g., reused) to produce additional gas/liquid mixture (with reference to FIGS. 5-6). In some implementations, a gas level may form above the upper level within the reaction vessel. The gas level can include, but is not limited to, unreacted carbon dioxide gas and/or VOCs.

In various implementations, a recirculation loop can be disposed between the intermediate level of the reaction vessel and the one or more diffusers. In particular, the recirculation loop can include various valves and pumps configured to receive at least a portion of the treated water of the intermediate level of the reaction vessel and provide the treated water to the one or more diffusers for beneficial reuse.

Figure 8:
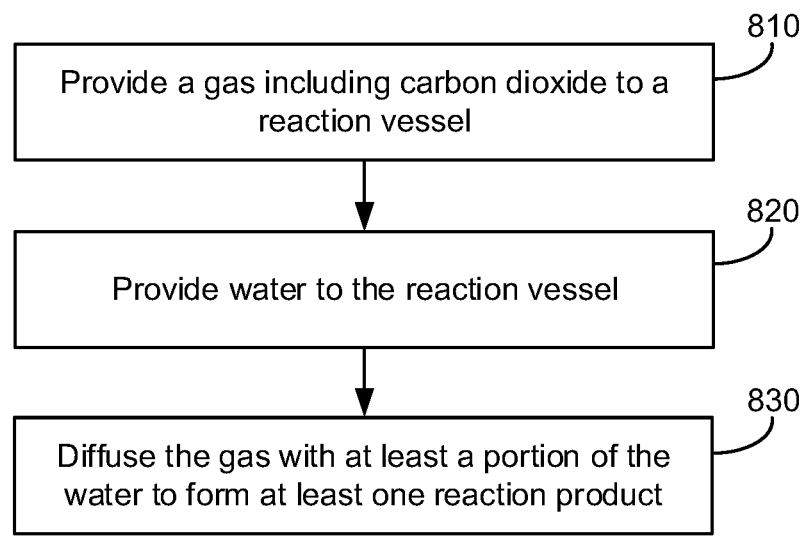
FIG. 8 is a flowchart for another method of carbon dioxide sequestration, according to an illustrative implementation.

Referring now to FIG. 8, a flowchart for another method 800 of carbon dioxide sequestration, according to an illustrative implementation. Method 800 may be implemented with the sequestration systems of FIGS. 1-3 and 5-6. Accordingly, method 800 may be described with regards to FIGS. 1-3 and 5-6. Although the method 800 of FIG. 8 is described with reference to carbon dioxide gas and produced water, it will be appreciated that similar operations may be used to treat any water; in particular, wastewater from various human activities.

In broad overview of method 800, at block 810, the sequestering system can provide a gas including carbon dioxide to a reaction vessel. At block 820, the sequestering system can provide water to the reaction vessel. At block 830, the sequestering system can diffuse the gas with at least a portion of the water to form at least one reaction product. In other embodiments, the method 800 may include additional, fewer, and/or different operations may be performed depending on the particular. In some embodiments, each operation may be re-ordered, added, removed, or repeated.

Referring to method 800 in more detail, at block 810 the sequestration system can provide a gas including carbon dioxide to a reaction vessel. That is, unlike in block 710 where the gas is provided to a diffuser outside the reaction vessel (or in-line), the gas can be provided (e.g., by pump 114 and/or valve 116) directly to a diffuser disposed within the reaction vessel (or in-vessel).

At block 820, the sequestration system can provide produced water from the hydrocarbon production to the reaction vessel, wherein the produced water includes the at least one in-situ chemical species. That is, unlike in block 820 where the water is provided to a diffuser outside the reaction vessel (or in-line), the water can be provided (e.g., by pump 114 and/or valve 116) directly into the reaction vessel.

At block 830, the sequestration system can diffuse, in the reaction vessel, the gas with at least a portion of the produced water to allow the at least one in-situ chemical species of the produced water to react with the gas to form the at least one reaction product, wherein the at least one reaction product settles to a lower portion of the reaction vessel. Alternatively to block 730, an in-vessel diffuser can provide a stream of gas (e.g., carbon dioxide gas) into the reaction vessel previously storing or provided with water by the water source. In particular, the in-vessel diffusers can generate gas bubbles that can allow content of the water to react and form one or more reaction products. In some implementations, a reaction promoter can be provided to the reaction vessel to accelerate one or more chemical reaction with the gas/liquid mixture. The at least one reaction product can be provided to a solid handling system (described in detail above). In some implementations, the treated water formed within the reaction vessel can be provided back to the reaction vessel for reuse (e.g., directly back into the reaction vessel).

Figure 9:
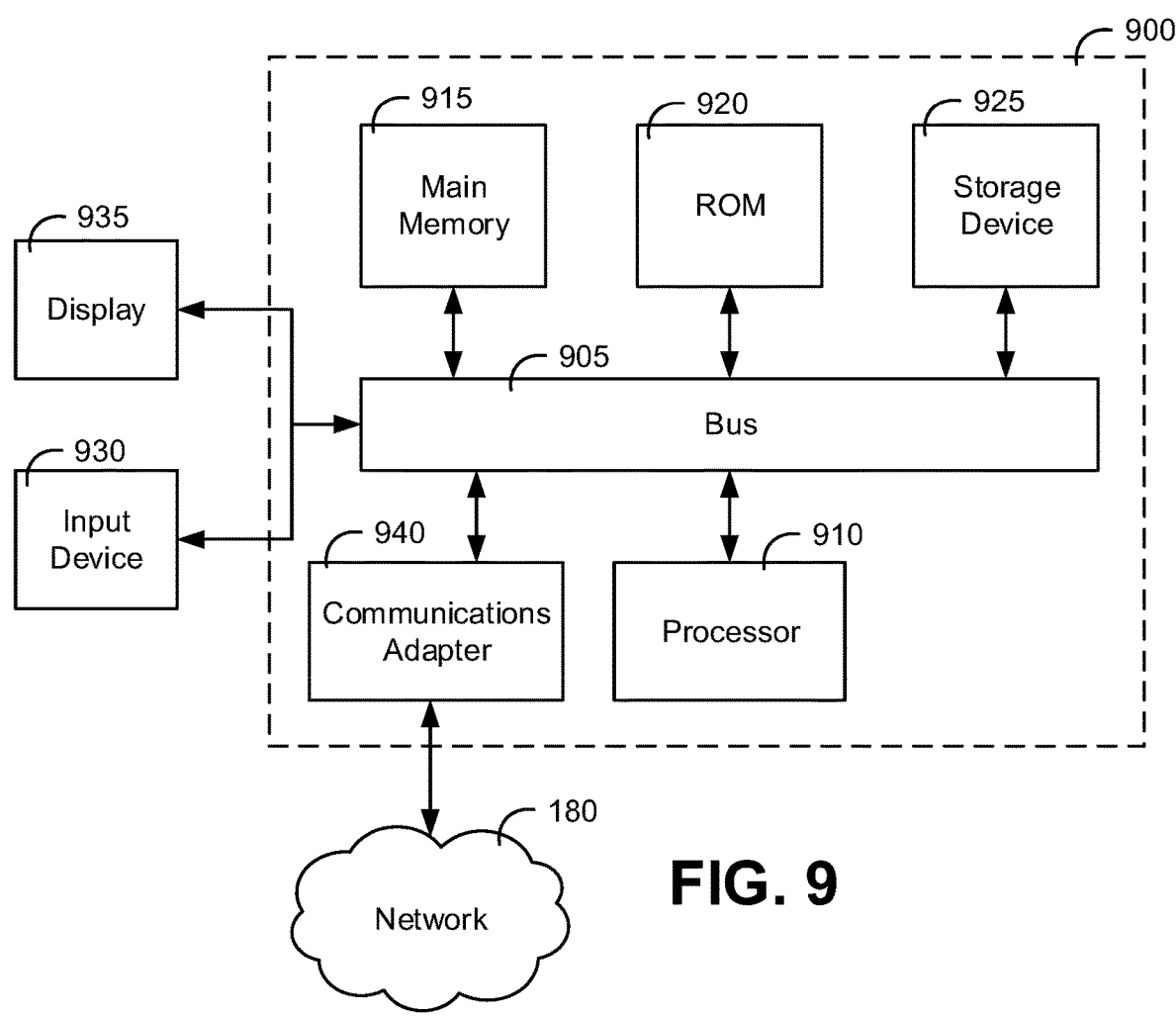
FIG. 9 is a block diagram illustrating an example computing system suitable for use in the various implementations described herein, according to an illustrative implementation.

Referring now to FIG. 9, a depiction of a computer system 900 is shown. The computer system 900 that can be used, for example, to sequestering system 100, sequestering system 200, sequestering system 300, sequestering system 500, sequestering system 600, and/or various other example systems described in the present disclosure. The computing system 900 includes a bus 905 or other communication component for communicating information and a processor 910 coupled to the bus 905 for processing information. The computing system 900 also includes main memory 915, such as a random-access memory (RAM) or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a read only memory (ROM) 820 or other static storage device coupled to the bus 905 for storing static information and instructions for the processor 910. A storage device 925, such as a solid-state device, magnetic disk, or optical disk, is coupled to the bus 905 for persistently storing information and instructions.

The computing system 900 may be coupled via the bus 905 to a display 935, such as a liquid crystal display, or active-matrix display, for displaying information to an operator. An input device 930, such as a keyboard including alphanumeric and other keys, may be coupled to the bus 905 for communicating information, and command selections to the processor 910. In another implementation, the input device 930 has a touch screen display 935. The input device 930 can include any type of biometric sensor, a cursor control, such as a mouse, a trackball, or cursor direction keys, for communicating direction information and command selections to the processor 910 and for controlling cursor movement on the display 935.

In some implementations, the computing system 900 may include a communications adapter 940, such as a networking adapter. Communications adapter 940 may be coupled to bus 905 and may be configured to enable communications with a computing or communications network 180 and/or other computing systems. In various illustrative implementations, any type of networking configuration may be achieved using communications adapter 940, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 900 in response to the processor 910 executing an implementation of instructions (e.g., operate valve, diffuse, add reaction promoter, etc.) contained in main memory 915. Such instructions can be read into main memory 915 from another computer-readable medium, such as the storage device 925. Execution of the implementation of instructions contained in main memory 915 causes the computing system 900 to perform the illustrative processes described herein. One or more processors in a multi-processing implementation may also be employed to execute the instructions contained in main memory 915. In alternative implementations, hard-wired circuitry may be used in place of or in combination with software instructions to implement illustrative implementations. Thus, implementations are not limited to any specific combination of hardware circuitry and software.

That is, although an example processing system has been described in FIG. 9, implementations of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 9 as singular, stand-alone devices, one of ordinary skill in the art will appreciate that, in some implementations, the computing system 900 may comprise virtualized systems and/or system resources. For example, in some implementations, the computing system 900 may be a virtual switch, virtual router, virtual host, virtual server. In various implementations, computing system 900 may share physical storage, hardware, and other resources with other virtual machines. In some implementations, virtual resources of the network 180 of FIG. 1 may include cloud computing resources such that a virtual resource may rely on distributed processing across more than one physical processor, distributed memory, etc.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one implementation, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. Although the examples provided herein relate to carbon dioxide gas and produced water from hydrocarbon production, the systems and methods described herein can include applied to other environments (e.g., wastewater, carbon tetroxide gas, etc.). The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

What is claimed is:

1. A method of carbon dioxide sequestration using at least one in-situ chemical species in produced water provided by hydrocarbon production to produce at least one reaction product that sequesters carbon dioxide, the method comprising:
   providing a gas including carbon dioxide;
   providing produced water from the hydrocarbon production, wherein the produced water includes the at least one in-situ chemical species;
   diffusing the gas with at least a portion of the produced water to produce a gas/liquid mixture; and
   providing the gas/liquid mixture to a reaction vessel to allow the at least one in-situ chemical species of the gas/liquid mixture to react with the carbon dioxide of the gas/liquid mixture to form the at least one reaction product, wherein the at least one reaction product settles at a lower level in the reaction vessel.

2. The method of claim 1, further comprising:
   adding a reaction promoter to the gas/liquid mixture prior to providing the gas/liquid mixture to the reaction vessel.

3. The method of claim 1, wherein the produced water further includes a hydrocarbon, and wherein an upper level is formed in the reaction vessel that includes the hydrocarbon provided in the produced water, and wherein the at least one reaction product at the lower level is below the upper level.

4. The method of claim 3, wherein the upper level further includes a floating floc, and wherein the at least one reaction product forms after a suitable dwell time.

5. The method of claim 3, wherein a middle level of treated water is formed in the reaction vessel, and wherein the middle level is positioned below the upper level and above the lower level.

6. The method of claim 5, wherein the middle level is contiguous with the upper level.

7. The method of claim 5, further comprising:
providing the treated water from the middle level of the reaction vessel, wherein the treated water includes reduced hydrocarbons and at least some reduced in-situ species as compared to the produced water.

8. The method of claim 5, further comprising:
providing the at least one reaction product from the reaction vessel to a solid handling system, and wherein a portion of the treated water is provided to assist with diffusing the gas with at least the portion of the produced water to produce the gas/liquid mixture.

9. The method of claim 3, wherein a gas level is formed in the reaction vessel that is positioned above the upper level.

10. The method of claim 1, wherein the at least one in-situ chemical species includes calcium, magnesium, barium, or strontium.

11. The method of claim 1, wherein the at least one reaction product at the lower level in the reaction vessel is a slurry including a combination of solid and liquid of the at least one reaction product.

12. A system for sequestering carbon dioxide using produced water that originates from hydrocarbon production, the system comprising:
a reaction vessel configured to receive a produced water supply, the produced water supply includes produced water that originates from the hydrocarbon production, wherein the produced water includes at least one in-situ chemical species, wherein the reaction vessel is further configured to receive a gas supply, the gas supply including carbon dioxide gas; and
one or more diffusers, wherein the one or more diffusers are configured to receive at least a portion of the gas supply to diffuse the carbon dioxide gas into at least a portion of the produced water, and wherein the reaction vessel is further configured to contain a mixture to allow the at least one in-situ chemical species of the produced water to react with the carbon dioxide gas to sequester the carbon dioxide gas by forming at least one reaction product, wherein the at least one reaction product settles at a lower level in the reaction vessel.

13. The system of claim 12, wherein the one or more diffusers are positioned upstream of the reaction vessel.

14. The system of claim 12, wherein the one or more diffusers are positioned within the reaction vessel.

15. The system of claim 12, wherein the produced water further includes a hydrocarbon, and wherein an upper level is formed in the reaction vessel that includes the hydrocarbon from the produced water, and wherein the at least one reaction product at the lower level is below the upper level.

16. The system of claim 15, wherein an intermediate level of treated water is formed in the reaction vessel, and wherein the intermediate level is positioned below the upper level and above the lower level, and wherein the intermediate level is contiguous with the upper level.

17. The system of claim 16, further comprising:
a recirculation loop positioned between the intermediate level of the reaction vessel and the one or more diffusers, wherein the recirculation loop is configured to receive at least a portion of the treated water of the intermediate level of the reaction vessel.

18. The system of claim 12, wherein the at least one reaction product at the lower level in the reaction vessel is a slurry including a combination of solid and liquid of the at least one reaction product.

19. A method of carbon dioxide sequestration using at least one in-situ chemical species in produced water provided by hydrocarbon production to produce at least one reaction product that sequesters carbon dioxide, the method comprising:
providing a gas including carbon dioxide to a reaction vessel;
providing produced water from the hydrocarbon production to the reaction vessel, wherein the produced water includes the at least one in-situ chemical species; and
diffusing, in the reaction vessel, the gas with at least a portion of the produced water to allow the at least one in-situ chemical species of the produced water to react with the gas to form the at least one reaction product, wherein the at least one reaction product settles to a lower portion of the reaction vessel.

20. The method of claim 19, further comprising:
adding a reaction promoter to the reaction vessel, wherein an upper level is formed in the reaction vessel that includes a hydrocarbon provided in the produced water, and wherein an intermediate level of treated water is formed in the reaction vessel, and wherein the intermediate level is positioned below the upper level and above a lower level.

* * * * *